United States Patent
Zhang et al.

(10) Patent No.: US 12,533,301 B2
(45) Date of Patent: Jan. 27, 2026

(54) COMPOSITE RESIN DENTURE PORCELAIN BLOCK, PREPARATION METHOD THEREOF AND COMPOSITE RESIN DENTURE

(71) Applicant: SHENZHEN YURUCHENG DENTAL MATERIALS CO., LTD., Shenzhen (CN)

(72) Inventors: Yu Zhang, Shenzhen (CN); Zongyu Li, Shenzhen (CN); Jianjun Liu, Shenzhen (CN); Jizong Hu, Shenzhen (CN); Wei Liu, Shenzhen (CN)

(73) Assignee: SHENZHEN YURUCHENG DENTAL MATERIALS CO., LTD., Shenzhen (CN)

( * ) Notice: Subject to any disclaimer, the term of this patent is extended or adjusted under 35 U.S.C. 154(b) by 172 days.

(21) Appl. No.: 18/364,595

(22) Filed: Aug. 3, 2023

(65) Prior Publication Data
US 2024/0050324 A1    Feb. 15, 2024

(30) Foreign Application Priority Data
Aug. 10, 2022   (CN) .................. 202210954994.5

(51) Int. Cl.
*A61K 6/887*   (2020.01)
*A61C 13/087*  (2006.01)
(Continued)

(52) U.S. Cl.
CPC ............ *A61K 6/887* (2020.01); *A61C 13/087* (2013.01); *A61K 6/818* (2020.01); *A61K 6/836* (2020.01); *A61K 6/871* (2020.01)

(58) Field of Classification Search
CPC ........ A61K 6/887; A61K 6/836; A61K 6/818; A61K 6/871; A61C 13/087
See application file for complete search history.

(56) References Cited

U.S. PATENT DOCUMENTS 6,495,614 B1    12/2002   Kamohara et al.
2021/0007938 A1*  1/2021  Kadobayashi ............ A61K 6/20

FOREIGN PATENT DOCUMENTS

CN    1981736 A    6/2007
CN   101244013 A   8/2008
(Continued)

OTHER PUBLICATIONS

Cai CN110028333A translation accessed on ESPacenet Jun. 10, 2025 (Year: 2019).*

(Continued)

*Primary Examiner* — Jamel M Nelson
*Assistant Examiner* — Erica Hartsell Funk
(74) *Attorney, Agent, or Firm* — Westbridge IP LLC

(57) ABSTRACT

Disclosed are a composite resin denture porcelain block, a preparation method thereof and a composite resin denture. The composite resin denture porcelain block includes 0.1% to 15% of carbamate dimethacrylate, 0.1% to 10% of bisphenol A-di glycidyl methacrylate, 3% to 20% of triethylene glycol dimethacrylate, 35% to 85% of glass powder, 0.1% to 8% of $ZrO_2$, 3% to 15% of $SiO_2$, 0.1% to 40% of $ZrO_2$—$SiO_2$ composite powder, 2% to 17% of diatomite, 0.01% to 3% of benzoyl peroxide, 0.01% to 3% of N,N dihydroxyethyl p-toluidine, 0.01% to 3% of 2,6 di-tert-butyl p-cresol, 0.001% to 0.2% of iron oxide red, 0.001% to 0.2% of iron oxide black, and 0.001% to 0.5% of iron oxide yellow. The composite resin denture porcelain block of the present application uses carbamate dimethacrylate, bisphenol A-di glycidyl methacrylate, and triethylene glycol dimethacrylate as the resin matrix.

2 Claims, 1 Drawing Sheet

(51) Int. Cl.
  *A61K 6/818*  (2020.01)
  *A61K 6/836*  (2020.01)
  *A61K 6/871*  (2020.01)

(56) References Cited

FOREIGN PATENT DOCUMENTS

| CN | 101804012 A    | 8/2010  |            |
|----|----------------|---------|------------|
| CN | 106420366 A    | 2/2017  |            |
| CN | 108524291 A    | 9/2018  |            |
| CN | 110028333 A *  | 7/2019  | ............ C04B 26/10 |
| EP | 3305341 A1     | 4/2018  |            |
| EP | 3689322 A1     | 8/2020  |            |
| EP | 3689322 B1 *   | 7/2023  | ............ A61K 6/887 |

OTHER PUBLICATIONS

First Office Action issued in counterpart Chinese Patent Application No. 202210954994.5, dated Jul. 14, 2023.
Zhang et al., Preparation of Bis-GMA/Nano(SiO2—ZrO2) Composite Resin Dental Material, Chinese Medical Equipment Journal, 2008, 29(9), pp. 1-3, dated Sep. 30, 2008.
European Search Report issued in counterpart European Patent Application No. EP 23189376.9, dated Jan. 2, 2024.

* cited by examiner

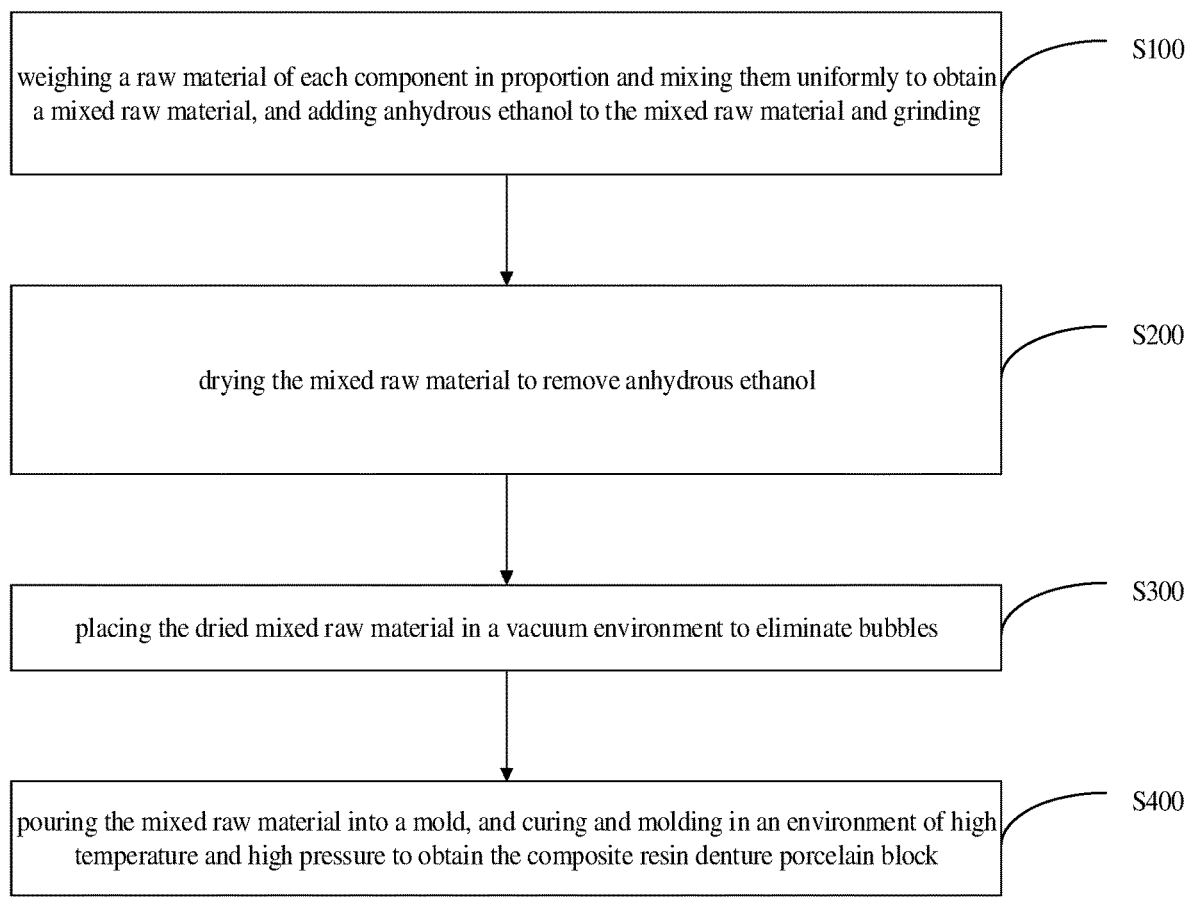

COMPOSITE RESIN DENTURE PORCELAIN BLOCK, PREPARATION METHOD THEREOF AND COMPOSITE RESIN DENTURE

CROSS-REFERENCE TO RELATED APPLICATIONS

This application claims priority to Chinese Patent Application No. 202210954994.5, filed on Aug. 10, 2022, the entire contents of which are incorporated herein by reference.

TECHNICAL FIELD

The present application relates to the technical field of denture material, and in particular, to a composite resin denture porcelain block, a preparation method thereof and a composite resin denture.

BACKGROUND

Dentures are what people often call "false teeth". In medicine, it is a general term for restorations made after the upper and lower teeth are partially or completely missing. There are two types of dentures: removable and fixed. Fixed dentures cannot be removed and worn by the patient themselves, while removable dentures can be easily removed and worn by the patient.

Dentures are made of various materials, such as zirconia porcelain blocks and glass ceramics. Zirconia ceramic blocks are highly brittle, difficult to cut and difficult to grind precisely. Both zirconia ceramic blocks and glass ceramics require final sintering, which is a complex process and low processing efficiency.

SUMMARY

The objective of the present application is to provide a composite resin denture porcelain block, a preparation method thereof and a composite resin denture with low brittleness, excellent cutting and processing performance, precise grinding, no final sintering and great improvement in processing efficiency.

The present application provides a composite resin denture porcelain block, including: 0.1% to 15% of carbamate dimethacrylate, 0.1% to 10% of bisphenol A-glycidyl dimethacrylate, 3% to 20% of triethylene glycol dimethacrylate, 35% to 85% of glass powder, 0.1% to 8% of $ZrO_2$, 3% to 15% of $SiO_2$, 0.1% to 40% of $ZrO_2$—$SiO_2$ composite powder, 2% to 17% of diatomite, 0.01% to 3% of benzoyl peroxide, 0.01% to 3% of N,N dihydroxyethyl p-toluidine, 0.01% to 3% of 2,6 di-tert-butyl p-cresol, 0.001% to 0.2% of iron oxide red, 0.001% to 0.2% of iron oxide black, and 0.001% to 0.5% of iron oxide yellow.

In an embodiment, the composite resin denture porcelain block includes: 0.1% to 5% of carbamate dimethacrylate, 0.1% to 5% of bisphenol A-glycidyl dimethacrylate, 5% to 10% of triethylene glycol dimethacrylate, 40% to 60% of glass powder, 0.1% to 5% of $ZrO_2$, 5% to 10% of $SiO_2$, 20% to 30% of $ZrO_2$—$SiO_2$ composite powder, 5% to 10% of diatomite, 0.01% to 0.5% of benzoyl peroxide, 0.01% to 0.5% of N,N dihydroxyethyl p-toluidine, 0.01% to 0.5% of 2,6 di-tert-butyl p-cresol, 0.001% to 0.05% of iron oxide red, 0.001% to 0.05% of iron oxide black, and 0.001% to 0.05% of iron oxide yellow.

In an embodiment, the composite resin denture porcelain block includes: 0.1% to 5% of carbamate dimethacrylate, 0.1% to 5% of bisphenol A-glycidyl dimethacrylate, 5% to 10% of triethylene glycol dimethacrylate, 60% to 80% of glass powder, 0.1% to 5% of $ZrO_2$, 5% to 10% of $SiO_2$, 0.1% to 5% of $ZrO_2$—$SiO_2$ composite powder, 5% to 10% of diatomite, 0.01% to 0.5% of benzoyl peroxide, 0.01% to 0.5% of N,N dihydroxyethyl p-toluidine, 0.01% to 0.5% of 2,6 di-tert-butyl p-cresol, 0.001% to 0.05% of iron oxide red, 0.001% to 0.05% of iron oxide black, and 0.001% to 0.05% of iron oxide yellow.

In an embodiment, the composite resin denture porcelain block includes: 5% to 10% of carbamate dimethacrylate, 0.1% to 5% of bisphenol A-glycidyl dimethacrylate, 5% to 10% of triethylene glycol dimethacrylate, 30% to 45% of glass powder, 0.1% to 5% of $ZrO_2$, 5% to 10% of $SiO_2$, 20% to 30% of $ZrO_2$—$SiO_2$ composite powder, 5% to 10% of diatomite, 0.01% to 0.5% of benzoyl peroxide, 0.01% to 0.5% of N,N dihydroxyethyl p-toluidine, 0.01% to 0.5% of 2,6 di-tert-butyl p-cresol, 0.001% to 0.05% of iron oxide red, 0.001% to 0.05% of iron oxide black, and 0.001% to 0.05% of iron oxide yellow.

In an embodiment, the $SiO_2$, $ZrO_2$, and $ZrO_2$—$SiO_2$ composite powder are nanoscale powders.

In an embodiment, the glass powder is barium glass powder.

The present application further provides a preparation method for a composite resin denture porcelain block, used for preparing the composite resin denture porcelain block as described above, the preparation method including:

weighing a raw material of each component in proportion and mixing them uniformly to obtain the mixed raw material, and adding anhydrous ethanol to the mixed raw material and grinding;

drying the mixed raw material to remove anhydrous ethanol;

placing the dried mixed raw material in a vacuum environment to remove air bubbles; and pouring the mixed raw material into a mold, and curing and molding in an environment of high temperature and high pressure to obtain the composite resin denture porcelain block.

In an embodiment, a mass ratio of the mixed raw material to the anhydrous ethanol is (1-2):1.

In an embodiment, a drying temperature for drying the mixed raw material is 40° C. to 70° C., and a holding time is 24 h to 48 h.

The present application further provides a composite resin denture made of the composite resin denture porcelain block as described above.

The composite resin denture porcelain block of the present application uses carbamate dimethacrylate, bisphenol A-glycidyl dimethacrylate, and triethylene glycol dimethacrylate as the resin matrix. The composite resin denture porcelain block has low brittleness, excellent cutting and processing performance, precise grinding, no final sintering during processing, and great improvement in processing efficiency. Moreover, the elastic modulus of the composite resin denture block is close to that of natural dentin, and the occlusion is comfortable after the denture is made.

BRIEF DESCRIPTION OF THE DRAWINGS

In order to more clearly illustrate the technical solutions in the embodiments of the present application or in the related art, drawings in the embodiments or in the related art will be briefly described below. Obviously, the drawings in the following description are only some embodiments of the present application. Other drawings can be obtained by those skilled in the art according to the structures shown in the drawings without creative work.

FIG. 1 is a schematic flowchart of a preparation method for composite resin denture porcelain block according to some embodiments of the present application.

The realization of the purpose, functional characteristics and advantages of the present application will be further described with reference to the attached drawings in combination with embodiments.

DETAILED DESCRIPTION OF THE EMBODIMENTS

It should be understood that the terms used and specific structures and functional details disclosed herein are only for describing specific embodiments and are representative, but that the present application may be embodied in many alternative forms and should not be interpreted as limited to only the embodiments set forth herein.

The present application will be described in detail below with reference to alternative embodiments.

The present application provides a composite resin denture porcelain block, calculated by mass percentage, including: 0.1% to 15% of carbamate dimethacrylate (UDMA), 0.1% to 10% of bisphenol A-glycidyl dimethacrylate (Bis-GMA), 3% to 20% of triethylene glycol dimethacrylate (TEGDMA), 35% to 85% of glass powder, 0.1% to 8% of $ZrO_2$, 3% to 15% of $SiO_2$, 0.1% to 40% of $ZrO_2$—$SiO_2$ composite powder, 2% to 17% of diatomite, 0.01% to 3% of benzoyl peroxide, 0.01% to 3% of N,N dihydroxyethyl p-toluidine, 0.01% to 3% of 2,6 di-tert-butyl p-cresol, 0.001% to 0.2% of iron oxide red, 0.001% to 0.2% of iron oxide black, and 0.001% to 0.5% of iron oxide yellow.

The composite resin denture porcelain block of the present application uses carbamate dimethacrylate, bisphenol A-glycidyl dimethacrylate, and triethylene glycol dimethacrylate as the resin matrix. The composite resin denture porcelain block has low brittleness, excellent cutting and processing performance, precise grinding, no final sintering during processing, and great improvement in processing efficiency. Moreover, the elastic modulus of the composite resin denture porcelain block is close to that of natural dentin, and the occlusion is comfortable after the denture is made.

In an embodiment, dimethyl ether dimethyl cellulose ester (UDMA), phenol A-dimethyl condensed glycidyl ester (Bis-GMA) served as the resin matrix to impart plasticity, curing characteristics and strength. Tri-etherified dimethyl cellulose ester (TEGDMA) can dilute monomers and reduce the viscosity of the resin matrix. Glass powder, $ZrO_2$, $SiO_2$, $ZrO_2$—$SiO_2$ composite powder, and diatomite are inorganic fillers, which increases strength and wear resistance. Benzoyl peroxide (BPO) acts as an initiator to cross-link and cure the resin matrix. N,N dihydroxyethyl p-toluidine (DHET) is used as a promoter to activate the initiator. 2,6 di-tert-butyl-p-cresol (DHET) acts as a polymerization inhibitor to prevent cross-linking and curing. Pigments of iron oxide red, iron oxide black, iron oxide yellow are used for coloring, iron oxide red shows red, iron oxide yellow shows yellow, and iron oxide black shows gray.

In an embodiment, in terms of mass percentage, the composite resin denture porcelain block includes 0.1% to 5% of carbamate dimethacrylate, 0.1% to 5% of bisphenol A-glycidyl dimethacrylate, 5% to 10% of triethylene glycol dimethacrylate, 40% to 60% of glass powder, 0.1% to 5% of $ZrO_2$, 5% to 10% of $SiO_2$, 20% to 30% of $ZrO_2$—$SiO_2$ composite powder, 5% to 10% of diatomite, 0.01% to 0.5% of benzoyl peroxide, 0.01% to 0.5% of N, N dihydroxyethyl p-toluidine, 0.01% to 0.5% of 2,6 di-tert-butyl-p-toluenol, 0.001% to 0.05% of iron oxide red, 0.001% to 0.05% of iron oxide black, and 0.001% to 0.05% of iron oxide yellow. In this embodiment, the composite resin denture porcelain block has superior comprehensive performance in bending strength, elastic modulus, Vickers hardness, and light transmittance.

For the specific proportion of each component, in another embodiment, calculated by mass percentage, the composite resin denture porcelain block includes 0.1% to 5% of carbamate dimethacrylate, 0.1% to 5% of bisphenol A-glycidyl dimethacrylate, 5% to 10% of triethylene glycol dimethacrylate, 60% to 80% of glass powder, 0.1% to 5% of $ZrO_2$, 5% to 10% of $SiO_2$, 0.1% to 5% of $ZrO_2$—$SiO_2$ composite powder, 5% to 10% of diatomite, 0.01% to 0.5% of benzoyl peroxide, 0.01% to 0.5% N,N dihydroxyethyl p-toluidine, 0.01% to 0.5% of 2,6 di-tert-butyl-p-cresol, 0.001% to 0.05% iron oxide red, 0.001% to 0.05% iron oxide black, and 0.001% to 0.05% iron oxide yellow.

For the specific proportion of each component, in another embodiment, calculated by mass percentage, the composite resin denture porcelain block includes 5% to 10% of carbamate dimethacrylate, 0.1% to 5% of bisphenol A-glycidyl dimethacrylate, 5% to 10% of triethylene glycol dimethacrylate, 30% to 45% of glass powder, 0.1% to 5% of $ZrO_2$, 5% to 10% of $SiO_2$, 20% to 30% of $ZrO_2$—$SiO_2$ composite powder, 5% to 10% of diatomite, 0.01% to 0.5% of benzoyl peroxide, 0.01% to 0.5% of N,N dihydroxyethyl p-toluidine, 0.01% to 0.5% of 2,6 di-tert-butyl-p-cresol, 0.001% to 0.05% of iron oxide red, 0.001% to 0.05% of iron oxide black, and 0.001% to 0.05% of iron oxide yellow.

In an embodiment, $SiO_2$, $ZrO_2$, and $ZrO_2$—$SiO_2$ composite powder are nanoscale powders.

In an embodiment, the glass powder is barium glass powder.

The present application also provides a preparation method for the composite resin denture porcelain block, used for preparing the composite resin denture porcelain block as described above. As shown in FIG. 1, the method includes:

S100, weighing a raw material of each component in proportion and mixing them uniformly to obtain a mixed raw material, and adding anhydrous ethanol to the mixed raw material and grinding;

S200, drying the mixed raw material to remove anhydrous ethanol;

S300, placing the dried mixed raw material in a vacuum environment to eliminate bubbles; and S400, pouring the mixed raw material into a mold, and curing and molding in an environment of high temperature and high pressure to obtain the composite resin denture porcelain block.

In an embodiment, in step S100, anhydrous ethanol acts as a solvent, and the mixed raw material can be uniformly dispersed in anhydrous ethanol. A mass ratio of the mixed raw material to the anhydrous ethanol is (1-2): 1, and a grinding time is 8 h to 12 h. In step S200, a drying temperature for drying the mixed raw material is 40° C. to 70° C., and a holding time is 24 h to 48 h. In step S300, a vacuum time is 15 h to 30 h, and the vacuum is repeatedly pumped at least 3 times. In step S400, a high temperature is 150° C. to 200° C., a high pressure is 200 MPa to 300 MPa, and the holding time is 2 h to 4 h.

The present application also provides a composite resin denture made of the composite resin denture porcelain block as described above.

EMBODIMENT

According to the formula in Table 1 below, the composite resin denture porcelain block is prepared.

TABLE 1

| component | Embodiment 1 | Embodiment 2 | Embodiment 3 |
|---|---|---|---|
| carbamate dimethacrylate | 0.1-5 | 0.1-5 | 5-10 |
| bisphenol A-glycidyl dimethacrylate | 0.1-5 | 0.1-5 | 0.1-5 |
| triethylene glycol dimethacrylate | 5-10 | 5-10 | 5-10 |
| barium glass powder | 60-80 | 40-60 | 30-45 |
| nano $ZrO_2$ | 0.1-5 | 0.1-5 | 0.1-5 |
| nano $SiO_2$ | 5-10 | 5-10 | 5-10 |
| nano $ZrO_2$—$SiO_2$ composite powder | 0.1-5 | 20-30 | 20-30 |
| diatomite | 5-10 | 5-10 | 5-10 |
| benzoyl peroxide | 0.01-0.5 | 0.01-0.5 | 0.01-0.5 |
| N,N dihydroxyethyl p-toluidine | 0.01-0.5 | 0.01-0.5 | 0.01-0.5 |
| 2,6 di-tert-butyl-p-cresol | 0.01-0.5 | 0.01-0.5 | 0.01-0.5 |
| iron oxide red | 0.001-0.05 | 0.001-0.05 | 0.001-0.05 |
| iron oxide black | 0.001-0.05 | 0.001-0.05 | 0.001-0.05 |
| iron oxide yellow | 0.001-0.05 | 0.001-0.05 | 0.001-0.05 |

The composite resin denture porcelain block is prepared from Embodiments 1 to 3 of Table 1 above, and the bending strength, elastic modulus, Vickers hardness, and light transmittance of the composite resin denture porcelain block are tested. The test results are shown in Table 2.

TABLE 2

| term | bending strength (MPa) | elastic modulus (GPa) | Vickers hardness (HV1) | light transmittance (%) |
|---|---|---|---|---|
| Embodiment 1 | 251 | 10.8 | 122 | 50.7 |
| Embodiment 2 | 269 | 11.2 | 129 | 53.2 |
| Embodiment 3 | 228 | 10.5 | 113 | 60.5 |

Embodiment 3 has the highest resin matrix content, resulting in the highest light transmittance. Due to the low content of inorganic fillers, the physical properties are lower than those of Embodiment 1 and Embodiment 2. The resin matrix content of Embodiment 1 is close to that of Embodiment 2, but the content of nano powder in Embodiment 2 is higher, so the performance of Embodiment 2 is better.

It should be noted that the limitations of each step included in the present application, without affecting the implementation of the specific embodiments, are not considered to limit the sequence of steps. The steps written in front can be executed first, later, or even simultaneously. As long as these embodiments can be implemented, it should be considered as falling within the scope of the present application.

The above description is a further detailed explanation of the present application in conjunction with specific optional embodiments, and it cannot be considered that the specific implementation of the present application is limited to these explanations. For those skilled in the art, without departing from the concept of the present application, several simple deductions or substitutions can be made, which should be considered as falling within the scope of the present application.

What is claimed is:

1. A preparation method for a composite resin denture porcelain block, comprising:
    weighing a raw material of each component in proportion and mixing them uniformly to obtain a mixed raw material, and adding anhydrous ethanol to the mixed raw material and grinding;
    drying the mixed raw material to remove anhydrous ethanol;
    placing the dried mixed raw material in a vacuum environment to eliminate air bubbles; and
    pouring the mixed raw material into a mold, and curing and molding in an environment of high temperature and high pressure to obtain the composite resin denture porcelain block;
    wherein a drying temperature for drying the mixed raw material is 40° C. to 70° C., and a holding time is 24 h to 48 h.

2. The preparation method of claim 1, wherein a mass ratio of the mixed raw material to the anhydrous ethanol is (1-2):1.

* * * * *